United States Patent
Chen et al.

(10) Patent No.: US 7,385,751 B2
(45) Date of Patent: *Jun. 10, 2008

(54) PROCESS FOR IMAGEWISE OPENING AND FILLING COLOR DISPLAY COMPONENTS AND COLOR DISPLAYS MANUFACTURED THEREOF

(75) Inventors: Xianhai Chen, San Jose, CA (US); HongMei Zang, Sunnyvale, CA (US); Zarng-Arh George Wu, Sunnyvale, CA (US); Rong-Chang Liang, Cupertino, CA (US)

(73) Assignee: SiPix Imaging, Inc., Fremont, CA (US)

( * ) Notice: Subject to any disclaimer, the term of this patent is extended or adjusted under 35 U.S.C. 154(b) by 178 days.

This patent is subject to a terminal disclaimer.

(21) Appl. No.: 11/292,802

(22) Filed: Dec. 2, 2005

(65) Prior Publication Data

US 2006/0132897 A1 Jun. 22, 2006

Related U.S. Application Data

(63) Continuation-in-part of application No. 10/284,586, filed on Oct. 30, 2002, now Pat. No. 6,972,893, which is a continuation-in-part of application No. 09/879,408, filed on Jun. 11, 2001, now Pat. No. 6,545,797.

(51) Int. Cl.
*G02B 26/00* (2006.01)
*G03G 17/04* (2006.01)

(52) U.S. Cl. .......................... 359/296; 430/32; 430/34; 430/38

(58) Field of Classification Search ............... 359/296; 245/105, 107; 430/323, 438, 32, 34, 38; 204/450, 600
See application file for complete search history.

(56) References Cited

U.S. PATENT DOCUMENTS

| | | | |
|---|---|---|---|
| 3,612,758 A | 10/1971 | Evans | |
| 4,298,448 A | 11/1981 | Muller et al. | |
| 4,680,103 A | 7/1987 | Beilin et al. | |
| 4,732,830 A | 3/1988 | DiSanto et al. | |
| 5,930,026 A | 7/1999 | Jacobson et al. | |
| 5,961,804 A | 10/1999 | Jacobson et al. | |
| 6,017,584 A | 1/2000 | Albert et al. | |
| 6,046,539 A | 4/2000 | Haven et al. | |
| 6,067,185 A | 5/2000 | Albert et al. | |

(Continued)

FOREIGN PATENT DOCUMENTS

GB 1 313 412 4/1973

(Continued)

OTHER PUBLICATIONS

Allen, K. (Oct. 2003). Electrophoretics Fulfilled. *Emerging Displays Review: Emerging Display Technologies, Monthly Report—Octomber 2003*, 9-14.

(Continued)

*Primary Examiner*—Scott J. Sugarman
*Assistant Examiner*—Tuyen Tra
(74) *Attorney, Agent, or Firm*—Howrey LLP

(57) ABSTRACT

This invention relates to the field of electrophoretic displays. In particular, it relates to imagewise opening, filling and sealing multicolor display components and the manufacture of multicolor displays.

32 Claims, 2 Drawing Sheets

U.S. PATENT DOCUMENTS

| | | | |
|---|---|---|---|
| 6,319,381 | B1 | 11/2001 | Nemelka |
| 6,545,797 | B2 | 4/2003 | Chen et al. |
| 6,672,921 | B1 | 1/2004 | Liang et al. |
| 6,788,449 | B2 | 9/2004 | Liang et al. |
| 6,788,452 | B2 | 9/2004 | Chen et al. |
| 6,795,138 | B2 | 9/2004 | Liang et al. |
| 6,795,229 | B2 | 9/2004 | Liang et al. |
| 6,821,799 | B2 | 11/2004 | Steckl et al. |
| 6,914,713 | B2 | 7/2005 | Chung et al. |
| 6,933,098 | B2 | 8/2005 | Chan-Park et al. |
| 6,960,818 | B1 | 11/2005 | Rengarajan et al. |
| 6,972,893 | B2 | 12/2005 | Chen et al. |
| 2002/0018043 | A1 | 2/2002 | Nakanishi |

FOREIGN PATENT DOCUMENTS

| | | |
|---|---|---|
| WO | WO 01/67170 | 9/2001 |
| WO | WO 02/01280 | 1/2002 |
| WO | WO 02/01281 | 1/2002 |
| WO | WO 02/056097 | 7/2002 |
| WO | WO 02/065215 | 8/2002 |
| WO | WO 03/081325 | 10/2003 |

OTHER PUBLICATIONS

Bardsley, J.N. & Pinnel, M.R. (Nov. 2004) Microcup™ Electrophoretic Displays. *USDC Flexible Display Report*, 3.1.2. pp. 3-12-3-16.

Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814, I9.6.1.

Chen, S.M. (Jul. 2003) The Applications for the Revolutionary Electronic Paper Technology. *OPTO News & Letters*, 102, 37-41. (in Chinese, English abstract attached, full translation available upon request).

Chen, S.M. (May 2003) The New Applications and the Dynamics of Companies. *TRI*. 1-10. (In Chinese, English abstract attached, full translation available upon request).

Chung, J., Hou, J., Wang, W., Chu, L.Y., Yao, W., & Liang, R.C. (Dec. 2003). Microcup(R) Electrophoretic Displays, Grayscale and Color Rendition. *IDW*, AMD2/EP1-2, 243-246.

Ho, Candice. (Feb. 1, 2005) *Microcupt® Electronic Paper Device and Application*. Presentation conducted at USDC 4th Annual Flexible Display Conference 2005.

Ho, C., & Liang, R.C. (Dec. 2003). *Microcup (R) Electronic Paper by Roll-to-Roll Manufacturing Processes*. Presentation conducted at FEG, Nei-Li, Taiwan.

Hopper, M.A., et al., "An Electrophoretic Display, its Properties, Model, and Addressing", IEEE Trans. Electr. Dev. 26/8:1148-1152 (1979).

Hou, J., Chen, Y., Li, Y., Weng, X., Li, H. And Pereira, C. (May 2004). Reliability and Performance of Flexible Electrophoretic Displays by Roll-to-Roll Manufacturing Processes. *SID Digest*, 32.3, 1066-1069.

Lee, H., & Liang, R.C. (Jun. 2003) SiPix Microcup(R) Electronic Paper—An Introduction. *Advanced Display*, Issue 37, 4-9 (in Chinese, English abstract attached, full translation available upon request).

Liang, R.C. (Feb. 2003) *Microcup(R) Electrophoretic and Liquid Crystal Displays by Roll-to-Roll Manufacturing Processes*. Presentation conducted at the Flexible Microelectronics & Displays Conference of U.S. Display Consortium, Phoenix, Arizona, USA.

Liang, R.C. (Apr. 2004). *Microcup Electronic Paper by Roll-to-Roll Manufacturing Process*. Presentation at the Flexible Displays & Electronics 2004 of Intertech, San Fransisco, California, USA.

Liang, R.C. (Oct. 2004) *Flexible and Roll-able Display/Electronic Paper—A Technology Overview*. Paper presented at the METS 2004 Conference in Taipie, Taiwan.

Liang, R.C., (Feb. 2005) *Flexible and Roll-able Displays/Electronic Paper—A Brief Technology Overview*. Flexible Display Forum, 2005, Taiwan.

Liang, R.C., Hou, J., Chung, J., Wang, X., Pereira, C., & Chen, Y. (2003). Microcup(R) Active and Passive Matrix Electrophoretic Displays by A Roll-to-Roll Manufacturing Processes. *SID Digest*, 20.1.

Liang, R.C., Hou, J., & Zang, H.M. (Dec. 2002) Microcup Electrophoretic Displays by Roll-to-Roll Manufacturing Processes. *IDW*, EP2-2, 1337-1340.

Liang, R.C., Hou, J., Zang, H.M., & Chung, J. (Feb. 2003). *Passive Matrix Microcup(R) Electrophoretic Displays*. Paper presented at the IDMC, Taipei, Taiwan.

Liang, R.C., Hou, J., Zang, H.M., Chung, J., & Tseng, S. (2003). Microcup(R) displays : Electronic Paper by Roll-to-Roll Manufacturing Processes. *Journal of the SID*, 11(4), 621-628.

Liang, R.C., Zang, H.M., Wang, X., Chung, J. & Lee, H., (Jun./Jul. 2004) << Format Flexible Microcup (R) Electronic Paper by Roll-to-Roll Manufacturing Process >>, Presentation conducted at the 14th FPD Manufacturing Technology Expo & Conference.

Liang, R.C., & Tseng, S. (Feb. 2003). *Microcup(R) LCD, An New Type of Dispersed LCD by A Roll-to-Roll Manufacturing Process*. Paper presented at the IDMC, Taipei, Taiwan.

Nikkei Microdevices. (Dec. 2002) Newly-Developed Color Electronic Paper Promises—Unbeatable Production Efficiency. *Nikkei Microdevices, 3*. (in Japanese, with English translation).

Wang, X., Kiluk, S., Chang, C., & Liang, R.C. (Feb. 2004). Microcup (R) Electronic Paper and the Converting Processes. *ASID*, 10.1.2-26, 396-399, Nanjing, China.

Wang, X., Kiluk, S., Chang, C., & Liang, R.C., (Jun. 2004) Microcup® Electronic Paper and the Converting Processes. *Advanced Display*, Issue 43, 48-51.

Zang, H.M. (Feb. 2004). *Microcup Electronic Paper*. Presentation conducted at the Displays & Microelectronics Conference of U.S. Display Consortium, Phoenix, Arizona, USA.

Zang, H.M. (Oct. 2003). *Microcup (R) Electronic Paper by Roll-to-Roll Manufacturing Processes*. Presentation conducted at the Advisory Board Meeting, Bowling Green State University, Ohio, USA.

Zang, H.M.Hou, Jack, (Feb. 2005) *Flexible Microcup® EPD by RTR Process*. Presentation conducted at 2nd Annual Paper-Like Displays Conference, Feb. 9-11, 2005, St. Pete Beach, Florida.

Zang, H.M, Hwang, J.J., Gu, H., Hou, J., Weng, X., Chen, Y., et al. (Jan. 2004). Threshold and Grayscale Stability of Microcup (R) Electronic Paper. *Proceeding of SPIE-IS&T Electronic Imaging, SPIE* vol. 5289, 102-108.

Zang, H.M., & Liang, R.C. (2003) Microcup Electronic Paper by Roll-to-Roll Manufacturing Processes. *The Spectrum*, 16(2), 16-21.

PROCESS FOR IMAGEWISE OPENING AND FILLING COLOR DISPLAY COMPONENTS AND COLOR DISPLAYS MANUFACTURED THEREOF

CROSS-REFERENCE TO RELATED APPLICATIONS

This application is a continuation-in-part of U.S. application Ser. No. 10/284,586 filed Oct. 30, 2002, now U.S. Pat. No. 6,972,893; which is a continuation-in-part of U.S. application Ser. No. 09/879,408, filed Jun. 11, 2001, now U.S. Pat. No. 6,545,797; the contents of all of which are incorporated herein by reference in their entirety.

FIELD OF INVENTION

This invention relates to the field of electrophoretic displays. In particular, it relates to imagewise opening and filling multicolor display components and the manufacture of multicolor displays.

BACKGROUND OF THE INVENTION

Electrophoretic displays (EPDs) are known non-emissive displays suitable for use in the display of digital, alphanumeric, analog or graphical information. An EPD system typically comprises a suspension of pigment particles in a dielectric liquid held between two electrodes, at least one of which is transparent. Applied potential across the electrodes causes the charged particles to migrate to one or the other electrode. Where the suspension includes pigment particles and a dielectric liquid of contrasting colors, the movement of the pigment particles will cause images to be displayed, which are visible through the transparent electrode(s) or a viewing sheet.

EPDs have attributes of excellent brightness and contrast, wide view angles, bistability and low power consumption when compared with liquid crystal displays. The basic technology associated with the development and manufacture of EPD's has been disclosed in U.S. Pat. Nos. 5,961,804, 4,732,830, 4,680,103, 4,298,448, 4,732,830 and cited patents therein; and the disclosures of these patents are incorporated herein by reference in their entirety.

Among the advantages of an EPD over other types of flat panel displays is the very low power consumption. This salient advantage makes the EPD particularly suitable for portable and battery powered devices such as laptops, cell phones, personal digital assistants, portable electronic medical and diagnostic devices, global positioning system devices and the like.

In order to prevent undesired movements of particles such as sedimentation in the dielectric fluid, partitions were proposed between the two electrodes for dividing the space into smaller cells. See for example, M. A Hopper and V. Novotny, IEEE Trans. Electr. Dev., Vol ED 26, No. 8, pp. 1148-1152 (1979). However, the filling and sealing processes of electrophoretic fluids in these cells are of very low throughput and high cost.

Attempts have been made to enclose the suspension in microcapsules. U.S. Pat. Nos. 5,961,804 and 5,930,026 describe microencapsulated EPDs. These displays have a substantially two dimensional arrangement of microcapsules each having therein an electrophoretic composition of charged pigment particles suspended in a dielectric fluid that visually contrasts with the particles.

U.S. Pat. Nos. 6,930,818 and 6,933,098 (the '818 and '098 Patents), assigned to the same inventive entity, describe EPDs comprising microcups of well-defined shape, size and aspect ratio, filled with charged pigment particles dispersed in an optically contrasting dielectric solvent. The methods of manufacturing such microcups have also been described in the '818 and '098 Patents and are incorporated by reference herein in their entirety.

The methods of preparing the improved color EPD disclosed in the '818 and '098 Patents include laminating preformed empty microcups with a layer of positively working photoresist, imagewise exposure of the positive photoresist to selectively open a certain number of microcups, developing the photoresist, filling the selectively opened microcups with a colored electrophoretic fluid, and sealing the filled microcups. The sequence of opening and developing the photoresist, and filling and sealing of the microcups may be performed in iterative steps to create sealed microcups filled with electrophoretic fluids of different colors.

One aspect of the above cited '818 Patent relates to a novel roll-to-roll process and apparatus which permit the manufacture of a display to be carried out continuously by a synchronized photolithographic process. The synchronized roll-to-roll process and apparatus are also useful for manufacturing liquid crystal displays (LCD) and other structures and assemblies for electronic devices.

The '098 Patent also describes the manufacture of a plurality of microcups which are formed integrally with one another as portions of a structured two-dimensional array assembly, being formed upon a support web including a patterned conductor film, such as addressable indium-tin oxide (ITO) lines. Each microcup of the array assembly is filled with a suspension or dispersion of charged pigment particles in a dielectric solvent, and sealed to form an electrophoretic cell.

The substrate web upon which the microcups are formed includes a display addressing array comprising pre-formed conductor film, such as ITO conductor lines. The conductor film (ITO lines) and support web are coated with a radiation curable layer. The film and radiation curable layer are then exposed imagewise to radiation to form the microcup wall structure. Following exposure, the unexposed area is removed by using a developer, leaving the cured microcup walls bonded to the conductor film/support web. The imagewise exposure may be by UV or other forms of radiation through a photomask to produce an image or predetermined pattern of exposure of the radiation curable material coated on the conductor film. Although it is generally not required for most applications, the mask may be positioned and aligned with respect to the conductor film, i.e., ITO lines, so that the transparent mask portions align with the spaces between ITO lines, and the opaque mask portions align with the ITO material. The '818 and '098 Patents also describe a microcup array prepared by a process including embossing a thermoplastic or thermoset precursor layer coated on a conductor film with a pre-patterned male mold, followed by releasing the mold. The precursor layer may be hardened by radiation, cooling, solvent evaporation, or other means. Solvent-resistant and thermomechanically stable microcups having a wide range of size, shape, pattern, and opening ratio can be prepared by either one of the aforesaid methods.

In addition, the above cited '818 and '098 Patents describe the manufacture of a monochrome EPD from a microcup assembly by filling the microcups with a single pigment suspension composition, sealing the microcups, and finally laminating the sealed array of microcups with a second conductor film pre-coated with an adhesive layer.

The '818 and '098 Patents also relate to the manufacture of a color EPD from a microcup assembly by a process of sequential selective opening and filling of predetermined microcup subsets. The process includes laminating or coating the pre-formed microcups with a layer of positively working photoresist, selectively opening a certain number of the microcups by imagewise exposing the positive photoresist, followed by developing the photoresist, filling the opened microcups with a colored electrophoretic fluid, and sealing the filled microcups by a sealing process. These steps may be repeated to create sealed microcups filled with electrophoretic fluids of different colors for a color EPD.

The '098 Patent also describes a synchronized roll-to-roll photolithographic exposure method and apparatus, which may be employed for a number of useful processes, including the process of making the microcup array and the process of selectively filling of the array of microcups to form a color display assembly. The imagewise roll-to-roll photolithographic exposure is performed through a moving photomask synchronized with a moving web substrate, to permit imagewise exposure of the workpiece (e.g., microcup array or color display) in a continuous or semi-continuous and seamless manner. This synchronized roll-to-roll exposure photolithographic process is also amenable for the manufacture of color displays.

The synchronized roll-to-roll process may be adapted to the preparation of a wide range of structures or discrete patterns for electronic devices formable upon a support web substrate, e.g., patterned ITO films, flexible circuit boards or the like.

However, where the manufacture of high contrast ratio color displays requires the use of microcups that are structurally wide and deep, resulting in relatively thin partitions between the microcups, defects in the finished displays are often observed.

These defects may be attributed to, in part, defects in various individual manufacturing steps, including poor mechanical and dissolution characteristics of the positive photoresist, error in the undercutting of the photoresist by a developer, and poor adhesion of the photoresist to the walls or partitions of the microcups. These manufacturing defects appear as indefinite microcup structures and adversely affect the quality of the display images. Therefore, there exists a need for a defect free manufacturing process for imagewise opening the microcups and filling them with selectively colored electrophoretic fluid for color EPDs.

SUMMARY OF THE INVENTION

In the broadest application of this invention, the innovative approach for the manufacture of multicolor displays involves the sequence of filling the microcups array with a removable temporary filler material which can be removed or washed away later by a developer used for the positively working photoresist, coating onto the filled microcups a positively working photoresist, imagewise exposing and developing the photoresist, removing the filler material during or after the photoresist development process, filling the emptied microcups with colored display fluids, and finally sealing the filled microcups by a sealing process disclosed in the co-pending '818 and '098 Patents. The same iterative process is then performed with different colored display fluids for multicolor displays.

The steps of adding and removing the temporary fillers serve to maintain structural integrity of the photoresist layer coated on the microcups in the non-imaging area, particularly for the photoresist coated on microcups having large and deep openings such as 50 to 200 microns in diameter and a depth in the range of 3 to 100 microns, preferably about 5 to 50 microns. The steps also eliminate the need of a tenting adhesive layer between the photoresist and the microcup array. The manufacturing process of this invention provides a much wider process and material latitude in the manufacture of high definition multicolor displays.

Various color display media or suspensions of different colors, compositions, liquid crystals, or any other suitable display fluids for generating multicolor displays known in the art may be used.

The resulting simple and efficient manufacturing processes disclosed in this application provide high quality, high resolution multi-color displays with significantly lower processing costs, less defects, higher yields, and no crosstalk among neighboring color fluids. These multi-step processes may also be carried out efficiently under roll-to-roll manipulation or processing as known in the art, or they may be carried out in batch operations, or conveyed through continuous or semi-continuous operations.

BRIEF DESCRIPTION OF DRAWINGS

FIG. 1A illustrates the microcups formed from various compositions of thermoplastic or thermoset precursor (1) on a conductor film (2) and substrate (3).

FIG. 1B illustrates the microcup array filled with a removable filler material (4) with a coating comprising a layer of positive photoresist (5).

FIG. 1C illustrates the result of the first imagewise exposure of the positive photoresist by radiation, development and removal of the coating, and removal of the filler material, producing the developed and cleaned microcups.

FIG. 1D illustrates the result of the first filling and sealing of the opened microcups with a first color display fluid (6).

FIG. 1E illustrates the result of the second imagewise exposure of the positive photoresist by radiation, development and removal of the coating, and the removal of the filler material, producing the developed and cleaned microcups.

FIG. 1F illustrates the result of the second filling and sealing of the opened microcups with a second color display fluid (7).

FIG. 1G illustrates the third imagewise exposure of the positive photoresist by radiation, development and removal of the coating, and the removal of the filler material, producing the developed and cleaned microcups.

FIG. 1H illustrates the result of the third filling and sealing of the opened microcups with a third color display fluid (8).

DETAILED DESCRIPTION OF THE INVENTION

Figure 1A:
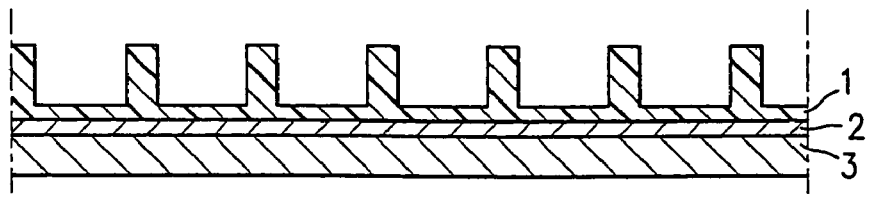
FIGS. 1A-1H illustrate various features of the invention of the process for the imagewise opening and filling of multi-color display components and the manufacture of the display.
Figure 1B:
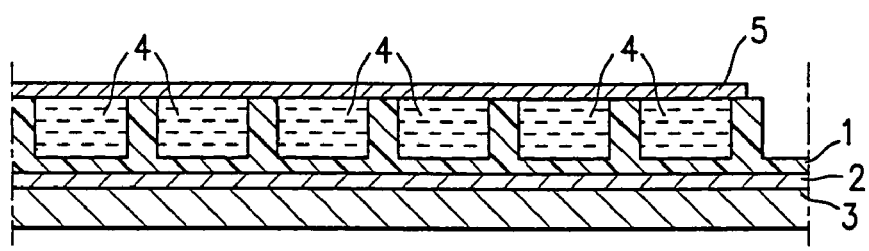
Figure 1C:
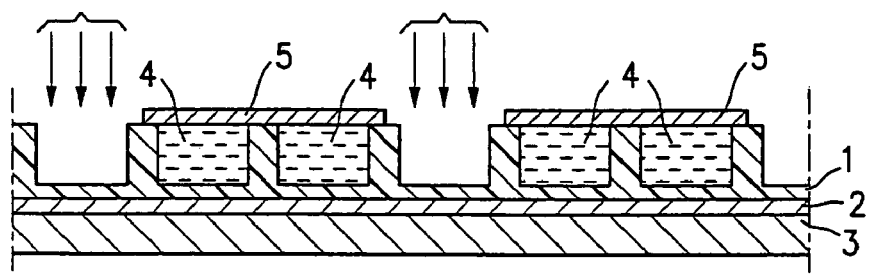
Figure 1D:
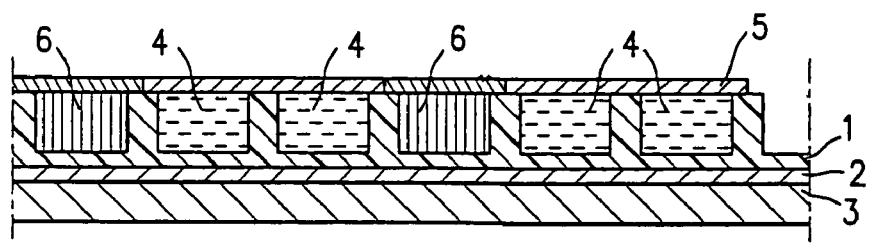
Figure 1E:
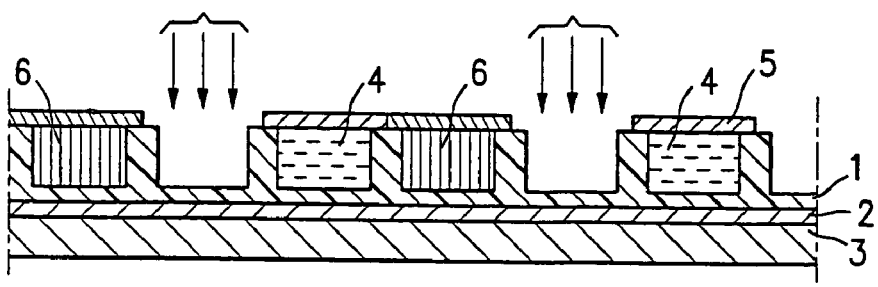
Figure 1F:
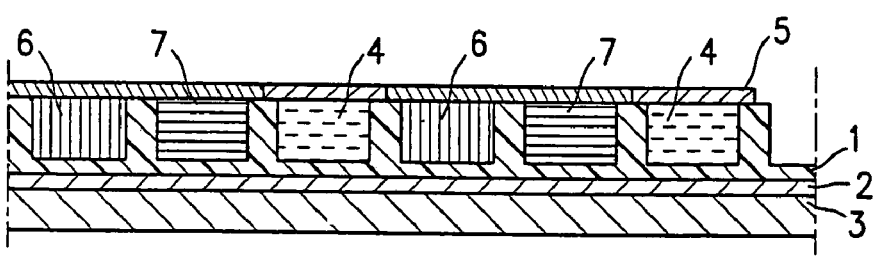
Figure 1G:
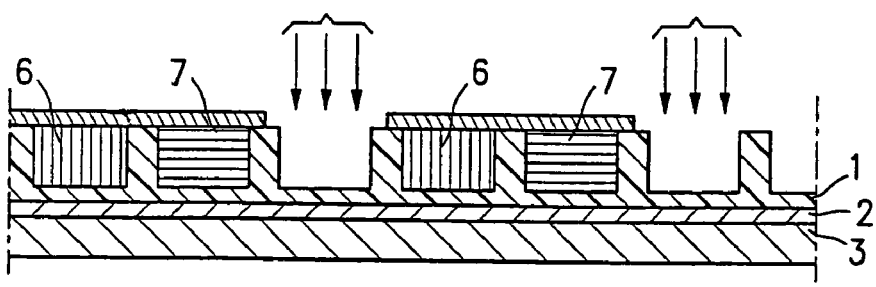
Figure 1H:
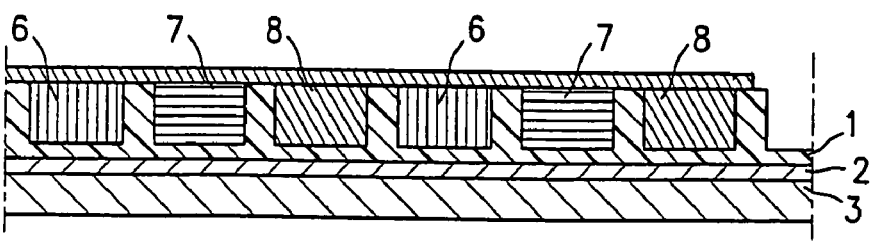

In the first aspect of this invention, microcups formed on a conductor substrate such as ITO/PET film, are filled with a removable temporary filler material. Microcups used for this invention may be circular, symmetrical or asymmetrical polygonal shapes with an opening area ranging from about 4 microns$^2$ to about $5 \times 10^5$ microns$^2$, preferably from about $10^3$ microns$^2$ to about $5 \times 10^4$ microns$^2$. The depth may be in the range of about 5 to about 100 microns, preferably from about 10 to about 50 microns. The depth to width ratio may be in the range of about 0.01 to 5, preferably from about 0.1 to 2.5.

The microcups may be arranged in many different geometric and non-geometric patterns, such as circles, polygonal such as squares, rectangular, diamond, triangular or combination thereof, for example, or they may be arranged in 2 or 3 dimensional, symmetrical or asymmetrical distributions such as a plurality of rows, columns or various combinations thereof to optimize the desired visual image of the displays.

The microcups may be prepared from various compositions of thermoplastic or thermoset precursor as described in co-pending '818 and '098 Patents assigned to the same inventive entity. The precursors may comprise multifunctional or polyvalent acrylates or methacrylates, cyanoacrylates, polyvalent vinyls including divinylbenzene, divinylsilane, polyvalent vinylethers, polyvalent epoxides, polyvalent allyls, and oligomers or polymers containing the above-mentioned crosslinkable functional groups or the like. Most preferably, the thermoplastic or thermoset precursor composition comprises multifunctional acrylates and their oligomers. A crosslinkable oligomer imparting flexibility, such as urethane acrylates, polybutadiene (and its copolymers), diacrylate, or polyester acrylates, is usually added to improve the flexure resistance of the embossed microcups. The composition of the microcups may contain oligomers, monomers, additives and optionally a polymer. More than one crosslinking mechanism may be employed. Examples include the use of hybrid of radical and cationic or ring opening polymerization mechanisms.

The '818 Patent describes EPDs comprising microcups of well-defined shape, size, pattern, and aspect ratio, and the microcups are filled with charged pigment particles dispersed in an optically contrasting dielectric solvent. In addition, their methods of manufacture have also been described in the same patent and are incorporated by reference herein in their entirety.

In the present invention, the microcup array was first filled with a removable temporary filler material, and then coated with a layer of positive photoresist. Suitable fillers for application in this invention, include materials which do not react with or adversely affect the integrity of the microcups or the unexposed photoresist and can be readily removed during or after the development of the photoresist.

Suitable fillers used in the present invention may include materials that may be readily removed or washed out of the microcups using a cleaning solution such as acidic or basic solutions (such as developers for positive photoresist), aqueous or non-aqueous solvents or solvent mixtures that do not adversely affect or react with the microcups or the positive photoresist. Suitable materials for use as a filler include inorganic, organic, organometallic, and polymeric materials, or their particulates. The filler should be soluble or dispersible in the cleaning solution.

Nonexclusive examples of filler materials may also include water-dispersible or soluble polymers such as AQ® branched polyesters (water-dispersible branched sulfopolyesters, Eastman Chemical Company), CARBOSET® (carboxylated acrylic-based) Polymers (BF Goodrich), polyvinylpyrrolidone, poly(vinyl alcohol), poly(4-vinyl phenol), novolac resin, and their copolymers. More preferable filler materials are non-film forming particles such as latexes of PMMA, polystyrene, polyethylene and their carboxylated copolymers and their corresponding salts, wax emulsions, colloidal silica, titanium oxide, and calcium carbonate dispersions, and mixtures thereof. Particularly preferable filler materials include aqueous dispersions of ionomers of ethylene copolymers such as ACQUA220® (zinc ionomer of ethylene copolymer), ACQUA240° (sodium ionomer dispersion of ethylene acrylic acid copolymer), and ACQUA250® (N,N-diethylethanolamine) (Honeywell, New Jersey). ACQUA220® and ACQUA250® can be removed with conventional alkaline cleaners including the developer used for typical novolac positive photoresists. ACQUA240® can be removed with hot or cold water. The dispersability or solubility of the fillers particularly the particulate fillers, may be enhanced by the use of additives such as surfactants, dispersing agents, KOH, triethanolamine, aromatic or aliphatic bases, aromatic or aliphatic acids, pre-exposed positive novolac photoresists, and water soluble polymers such as polyethylene glycol, polyvinyl alcohol, polyvinylpyrrolidone, polyvinylpyridine, polyacrylic acid, polymethacrylic acid, polyacrylamide, and their copolymers.

It has been found that the use of positive photoresist as a filler is particularly useful in applications for the selective opening, filling and sealing of relatively shallow microcups. If the microcup is totally filled with unexposed positive photoresist, the preferred microcup depth is less than 10 microns, and more preferably, less than 5 microns. For deeper microcups, a positive photoresist can be undercoated into the microcup, exposed and then over-coated with a layer of positive photoresist.

In the second aspect of this invention, the microcups containing the fillers are over-coated with a positive photoresist by using Myrad bar, gravure, doctor blade, slot coating or slit coating, or a similar device. A variety of commercially available positive photoresists are suitable for this invention. Examples include novolac based photoresists such as S-1818, SJR-1075, SJR-3000, SJR-5440, SJR-5740, APEX®-E DUV (Shipley Company), AZ-9260, AZ-4620, AZ-4562 (AZ Electronic Materials, Clariant AG), and THB-Positive (JSR Microelectronics). In the case that the positively working photoresist itself is also the filler, photoresists used for thick coating applications such as SJR-5440, SJR-5740 and those containing the t-BOC component are preferred.

In over-coating of the microcups, an excess of photoresist is usually applied in a sufficient amount to ensure that the microcups are fully covered by the resist. Preferably, application of the photoresist over the filled microcups is made such that the thickness of the resist layer above the top surface of the microcups is controlled to be in a range of about 0.1 to 5 microns, more preferably from about 0.5 to 3 microns. Precision coating of the resist may be performed using known procedures and devices such as a Myrad bar, gravure, doctor blade, slot coating or slit coating, or a related device. Excess photoresist over the microcups may be removed using a number of methods known in the art, including scraping with a wiper blade or similar device. The photoresist is then baked in the oven by using standard procedures as suggested by photoresist suppliers. Subsequent imagewise exposure of the photoresist may be performed using a UV light source such as Loctite Zeta 7410 exposure unit equipped with a metal halide lamp with an intensity of about 6 mW/cm2 at 365 nm, or ORIEL 87000 Series UV System equipped with 500 watts Model 68810 Mercury ARC Lamp with an intensity of about 5 mW/cm$^2$ at 365 nm. Exposure is performed for a period of time sufficient to show image discrimination with good contrast after the photoresist is developed by a developer.

In the third aspect of the present invention, a synchronized exposure mechanism is employed. In effect, a photomask loop is "rolled" in a synchronized motion relative to a web, so as to maintain alignment and registration between the mask and the web during exposure. In a continuous synchronized motion and exposure process, the web and mask are moved at the same speed in the same direction during exposure in order to maintain this constant alignment and registration. Imagewise exposure of the photoresist on selected discrete microcups can be achieved precisely and continuously on the web.

In the fourth aspect of the present invention, the exposed positive photoresist on selected microcups is developed and removed using a developer such as DEVELOPER 351® (sodium hydroxide, sodium tetraborate decahydrate and borate solution) and DEVELOPER 453® (potassium hydroxide and borate solution), both of Shipley Company, Marlborough, Mass. The uncovered microcups may then be thoroughly washed with distilled water or a diluted developer solution to remove the filler material. Surfactants, such as TRITON® X-100 (polyethylene glycol tert-octylphenyl ether, Union Carbide), AEROSOL® OT (wetting agents for use in reducing the interfacial tension between liquids and solids or between two immiscible liquids), sodium dodecylbenzene sulfonate may be added to improve the efficiency of removal of the filler in the exposed areas. The developed and cleaned microcups are then dried by using air flow, heat, or vacuum, etc.

In the fifth aspect of the invention, the opened microcups are filled with the first color display fluid, optionally containing a thermoplastic or thermoset precursor (see below), using standard coating methods as those used to coat the photoresist and filler material onto the microcups. Alternatively, the filling may be accomplished by methods such as screen printing, gravure printing, inkjet printing or the like.

Various color display fluids and suspensions are known in the art, including liquid crystals containing dichroic dyes of various colors, and different color electrophoretic fluids as described in co-pending '818 and '098 Patents.

In the sixth aspect of the invention, the filled microcups are sealed. Sealing of the microcups can be accomplished by a variety of methods described in the co-pending '818 and '098 Patents. In one of the preferred embodiments, sealing may be accomplished by dispersing a thermoplastic or thermoset precursor in the EPD fluid. The compositions of the display fluid and the thermoplastic or thermoset precursor are selected such that the display fluid is immiscible with the precursor which has a specific gravity lower than that of the display fluid. After filling the microcups with the precursor/display fluid mixture, the precursor phase separates from the color display fluid and forms a supernatant layer which is then hardened or cured by solvent evaporation, interfacial reaction, moisture, heat or radiation. Preferably, the sealing layer is hardened by radiation, such as UV, although a combination of two or more methods as described above may be used to increase the throughput of the sealing step.

Alternatively, sealing of the microcups may be accomplished by overcoating the display fluid with a solution of thermoplastic or thermoset precursor. The sealing is accomplished by hardening the precursor by solvent evaporation, interfacial reaction, moisture, heat, radiation, or a combination of various curing mechanisms. Preferably, the overcoating solution is lighter than the display fluid and has a limited miscibility with the latter to reduce the degree of intermixing during coating. Good coating uniformity and satisfactory adhesion between the sealing layer and the microcup array can be achieved by carefully adjusting surface tension and viscosity of the overcoating solution.

The complete manufacturing steps as described above may be repeated using other selected colored display fluids in the desired configuration to fill in the selected microcups. The filled and sealed multicolor microcup array is then laminated onto a conductor film such as ITO on PET with an adhesive.

The EPDs manufactured according to the present invention may be applied to the roll-to-roll continuous, or semi-continuous manufacturing operation of thin, highly flexible, and durable multi-color displays with excellent color addressability for many different applications.

The EPD prepared according to the present invention is not sensitive to manufacturing environment, such as humidity and temperature. The resulting display is thin, flexible, durable, easy-to-handle, and format-flexible. Since the EPD prepared according to the present invention comprises microcups of favorable aspect ratio and well-defined shape and size, the bi-stable reflective display has excellent color addressability, high contrast ratio, and fast switching rate.

Definitions:

"Aspect ratio" refers to the depth (or height) to width, depth to length, or depth to diameter ratio of the microcups.

The term "well defined" herein is used to describe microcups or cells, and indicates that the microcup or cell has a definite shape, size and aspect ratio which are pre-determined according to the specific parameters of the manufacturing process.

EXAMPLES

Example 1

Microcup Formulation

35 Parts by weight of Ebecryl 600 (UCB), 40 parts of SR-399 (Sartomer), 10 parts of Ebecryl 4827 (UCB), 7 parts of Ebecryl 1360 (UCB), 8 parts of HDDA (UCB), 0.05 parts of Irgacure 369 (Ciba Specialty Chemicals), and 0.01 parts of isopropyl thioxanthone (ITX, Aldrich) were mixed homogeneously and used for micro-embossing.

Example 2

Preparation of Microcup Array

A primer solution comprising of 5 parts of Ebecryl 830, 2.6 parts of SR-399 (Sartomer), 1.8 parts of Ebecry 1701, 1 part of PMMA (Mw=350,000, Aldrich), 0.5 parts of Irgacure 500, and 40 parts of methyl ethyl ketone (MEK) was coated onto a 2 mil 60 ohm/sq. ITO/PET film (Sheldahl Inc., MN) using a #3 Myrad bar, dried, and UV cured by using the Zeta 7410 (5 w/cm$^2$, Loctite) exposure unit for 15 minutes in air. The microcup formulation prepared in Example 1 was coated onto the treated ITO/PET film with a targeted thickness of about 50 µm, embossed with a Ni—Co male mold having a 60 (width) µm×60 (length) µm repetitive protrusion pattern with 10 µm wide partition lines and UV cured from the PET side for 20 seconds, removed from the mold with a 2" peeling bar at a speed of about 4-5 ft/min. Well-defined microcups with depth ranging from 10 to 50 µm were prepared by using male molds having corresponding protrusion heights.

Example 3

Comparative Example

Microcup Array Laminated with Novolac Photoresist

3 Grams/M$^2$ (dried) of the positively working photoresist SJR-5740 (Shipley, Mass.) was coated on a removable clear support PET-4851 (Saint-Gobain, Mass.) with a Myrad bar. Onto the photoresist, 3 gm/m$^2$ (dried) of an alkali-developable adhesive composition comprising 9 parts of Nacor 72-8685 (50% solid, National Starch) and 91 parts of 20% aqueous solution of Carboset 515 (BF Goodrich) was then coated with a Myrad bar. The three layer adhesive/photoresist/support was then laminated at 40° C. onto a 10 micron deep and empty microcup array prepared according to Example 2. The PET support was removed, and the photoresist laminated microcup array was imagewise exposed through a photomask using the Zeta 7410 (5 w/cm$^2$, Loctite) exposure unit for about 1 minute and then developed by Developer-453 (Shipley) for 2 minutes. Deterioration of photoresist integrity in the non-exposed regions such as pin holes and delamination of photoresist from the microcups was observed after the development step.

Example 4

10 Micron Deep Microcups Fully Filled with Photoresist

A 10 micron deep microcup array prepared according to Example 2 was corona treated with the BD-10A corona surface treater (Electron-Technic Products, Inc, Chicago, Ill.) for about 1 minute, then coated with photoresist SJR-5740 (42.5% solid) by using a #8 Myrad bar. The photoresist thickness above the top surface of the microcups was measured to be about 3 microns. The coated microcup array was imagewise UV exposed using the Zeta 7410 exposure unit for about 1 minute and then developed by Developer-453 (Shipley) for 2 minutes. Good image discrimination with no deterioration of photoresist integrity on the partition wall in the non-exposed regions was observed. The exposure-development cycle was repeated once. No deterioration of photoresist integrity on the partition wall in the non-exposed regions was observed after the second development process.

Example 5

Comparative Example

40 Micron Deep Microcups Fully Filled with Photoresist

The same procedure was performed as in Example 4, except that a 40 micron deep microcup array was used and the exposure time and development time were increased to 2 minutes and 13 minutes, respectively. Some defects and undesirable development of the photoresist on the partition wall in the non-exposed area were observed after the second development process.

Example 6

Microcups Filled with Particulate Filler and Over-coated with Photoresist

A 35 micron depth microcup array prepared according to Example 2 was used. A filler composition containing 1 part of 10% aqueous solution of PVA 205 (Air Product) and 9 parts of a polystyrene latex (50% solid) was coated onto the microcups using a Universal Blade preset at a 25 micron gap opening. The microcup array was dried and an optical microscope examination was performed to confirm slightly under-filled microcups. The filled microcup array was over-coated with the positive photoresist SJR-5740 by using a Universal Blade preset at a 10 micron gap opening. The targeted thickness of the photoresist above the filler was 3 microns. After imagewise exposure for 30 seconds, the microcup array was developed with Developer-453 for 1 minute followed by a thorough rinse with de-ionized water. The exposure-development-washing cycle was repeated once. No deterioration of photoresist integrity on the partition wall in the non-exposed regions was observed after the second cycle.

Example 7

Microcups Filled with Particulate Filler and Coated with Photoresist

The same procedure was performed as in Example 6, except the polystyrene latex was replaced by ACqua220, ACqua240, and ACqua250 (Honeywell, New Jersey) in three separate experiments. Excellent image discrimination without defect in the non-exposed regions was observed after the second cycle.

Example 8-13

Fillers Containing Photosensitive Solubility Inhibitor

The procedure was performed as in Example 6, except that the filler was replaced by the composition shown in Table 1. Thus, 0-20% of a photoactive compound, 4-t-butylphenol 215 ester (St-Jean Photochemical) and 0-10% of polyvinylphenol (Aldrich, Mn=8000 or Mn=20,000) were added to the water dispersible resin AQ-1350 (Eastman Chemical) in MEK and coated onto microcups. The slightly under-filled microcups were blanket exposed for 2 minutes then overcoated with the photoresist SJR-5740 by using a Universal Blade preset at a 7 micron gap opening. The photoresist overcoated microcup array was imagewise exposed for 30 seconds and developed by the Developer-453 for 2 minutes. The exposure-development cycle was repeated once. No deterioration of photoresist integrity on the partition wall in the non-exposed regions was observed after the second cycle.

TABLE 1

| | Fillers containing exposed photosensitive solubility inhibitor (parts by weight) | | | |
| --- | --- | --- | --- | --- |
| Example No. | AQ-1350 | PAC | PVPL-8,000 | PVPL-20,000 |
| 8 | 100 | 0 | | |
| 9 | 100 | 10 | | |
| 10 | 100 | 10 | 10 | |
| 11 | 100 | 10 | | 10 |
| 12 | 100 | 20 | | |
| 13 | 100 | 20 | 10 | |

PAC = 4-t-Butylphenol 215-ester;
PVPL = Poly(4-vinyl phenol).

Example 14

Exposed Novolac Photoresist as the Filler

The same procedure was performed as in Examples 8-13, except the filler was replaced by the photoresist SJR-5740. The exposure-development cycle was repeated once. No deterioration of photoresist integrity on the partition wall in the non-exposed regions was observed after the second cycle.

Example 15

TiO$_2$ Dispersion 6.42 Grams of Ti Pure R706 (Du Pont) were dispersed with a homogenizer into a solution containing 1.94 grams of Fluorolink D (Ausimont), 0.22 grams of Fluorolink 7004 (Ausimont), 0.37 grams of a fluorinated copper phthalocyanine dye (3M), and 52.54 grams of perfluoro solvent HT-200 (Ausimont).

Example 16

TiO$_2$ Dispersion

The same procedure was performed as in Example 15, except that the Ti Pure R706 and Fluorolink were replaced by a polymer coated TiO$_2$ particles PC-9003 (Elimentis, Highstown, N.J.) and Krytox (Du Pont), respectively.

Example 17

Microcup Sealing

A microcup array of 35 microns depth prepared in Example 2 was used. 85 Parts of the TiO$_2$ dispersion prepared in Example 15 were diluted with 15 parts of a perfluoro solvent FC-77 (3M) and coated onto microcups by using a Universal Blade Applicator with a 0.1 mil gap opening. A slightly underfilled microcup array was obtained. A 7.5% solution of polyisoprene in heptane was then overcoated onto the partially filled cups by a Universal Blade Applicator with a 6 mil opening. The overcoated microcups were then dried at room temperature. A seamless sealing layer of about 6 micron thickness was observed under microscope. No entrapped air bubbles were observed in the sealed microcups.

Example 18

Microcup Sealing

The same procedure was performed as in Example 17, except the TiO$_2$ dispersion prepared in Example 16 was used. A seamless sealing layer of about 6 micron thickness was observed under microscope. No entrapped air bubbles were observed in the sealed microcups.

While particular forms of the invention have been illustrated and described, it will be apparent that various modifications can be made without departing from the spirit and scope of the invention. Accordingly, it is not intended that the invention be limited, except as by the appended claims.

What is claimed is:

1. A process for the manufacture of a multicolor display, which process comprises:
   (a) filling all display cells with a filler material;
   (b) removing the filler material from selected display cells;
   (c) filling said selected display cells with a display fluid of a first color;
   (d) sealing said selected display cells that are filled with said display fluid of the first color; and
   (e) repeating steps (b) through (d) to fill and seal display fluids of different colors in display cells which are still filled with the filler material.

2. The process of claim 1 wherein said filler material is selected from the group consisting of organic, inorganic and polymer particulates, water soluble and dispersible polymers and mixtures thereof.

3. The process of claim 1 wherein said filler material is selected from the group consisting of water-dispersible branched sulfopolyesters, carboxylated acrylic-based polymers, poly(vinyl alcohol), polyvinylpyrrolidone, poly(4-vinyl phenol), pre-exposed positive photoresists, polyacrylic acid, polymethacrylic acid, and their copolymers, zinc ionomer of ethylene copolymer, sodium ionomer dispersion of ethylene acrylic acid copolymer, and N,N-diethylethanolamine dispersions, non-film forming latexes, colloidal silica, and mixtures thereof.

4. The process of claim 3 wherein said non-film forming latex is PMMA or polystyrene latex.

5. The process of claim 1 wherein step (b) is carried out by coating said display cells filled with said filler material with a layer of photoresist, followed by imagewise exposing and developing the photoresist to selectively open the display cells filled with said filler material and remove the filler material.

6. The process of claim 5 wherein said layer of photoresist has a thickness in the range of about 0.5 to 15 microns.

7. The process of claim 6 wherein said layer of photoresist has a thickness in the range of about 1 to 3 microns.

8. The process of claim 5 wherein said photoresist is a novolac-based photoresist.

9. The process of claim 5 wherein said photoresist is a polyvinylphenol-based photoresist.

10. The process of claim 5 wherein said photoresist is a t-BOC derivative of polyvinylphenol-based photoresist.

11. The process of claim 5 wherein said exposing step is performed by UV radiation, visible light or other radiation sources.

12. The process of claim 11 further comprising the step of soft baking the photoresist before said exposing step.

13. The process of claim 5 wherein said developing step comprises contacting exposed display cells with a developing solution.

14. The process of claim 13 wherein said developing solution is a base developer selected from the group consisting of alkaline solutions, sodium hydroxide, sodium tetraborate decahydrate and borate solution and potassium hydroxide and borate solution.

15. The process of claim 13 wherein said developing solution comprises an additive.

16. The process of claim 15 wherein said additive is a surfactant or dispersing agent.

17. The process of claim 5 further comprising the step of washing the developed display cells with a solvent or a mixture of solvents.

18. The process of claim 17 wherein said solvent is distilled water or deionized water.

19. The process of claim 1 wherein said filler material is capable of being readily removed from the display cells by using a cleaning solution which is a weak solvent or non-solvent for the non-exposed photoresist, but is a good solvent or dispersion medium for the filler material.

20. The process of claim 19 wherein said cleaning solution is an aqueous solution.

21. The process of claim 1 wherein said filler material comprises an additive selected from the group consisting of surfactants, dispersing agents and photosensitive dissolution-inhibiting compounds.

22. The process of claim 21 wherein said photosensitive dissolution-inhibiting compound is a diazide compound.

23. The process of claim 1 wherein said filler material is a pre-exposed positive working novolac photoresist.

24. The process of claim 1 wherein said display fluid is an electrophoretic fluid comprising charged pigment particles dispersed in a dielectric solvent.

25. The process of claim 24 wherein said pigment particles are white particles.

26. The process of claim 1 wherein said display fluid comprises liquid crystals.

27. The process of claim 26 wherein said liquid crystals comprise a dichroic dye.

28. The process of claim 1 wherein said sealing step is carried out with a sealing composition which has a specific gravity lower than that of said display fluid.

29. The process of claim 28 wherein said sealing step is carried out by overcoating said sealing composition on said display fluid.

30. The process of claim 28 wherein said sealing step is carried out by filling said display fluid with said sealing composition dispersed therein.

31. The process of claim 1 which is carried out continuously or semi-continuously.

32. The process of claim 1 wherein step (c) is carried out by screen printing, gravure printing or inkjet printing.

* * * * *